United States Patent [19]

Yokoyama et al.

[11] Patent Number: 5,464,512

[45] Date of Patent: Nov. 7, 1995

[54] METHOD OF URANIUM ISOTOPE ENRICHMENT BY UTILIZING A PHOTOCHEMICALLY SELECTIVE EFFECT

[75] Inventors: Yu Yokoyama, Takarazuka; Souichi Sato, Katsuta, both of Japan

[73] Assignee: Doryokuro Kakunenryo Kiahatsu Jigyodan, Tokyo, Japan

[21] Appl. No.: 223,060

[22] Filed: Apr. 6, 1994

[30] Foreign Application Priority Data

Apr. 15, 1993 [JP] Japan .................... 5-088372

[51] Int. Cl.$^6$ .................... B01D 5/00
[52] U.S. Cl. .................... 204/157.2; 204/157.41; 204/157.21; 204/157.22
[58] Field of Search .............. 423/3, 260; 204/157.2, 204/157.41, 157.21, 157.22; 250/298, 291, 423 P

[56] References Cited

U.S. PATENT DOCUMENTS

| | | | |
|---|---|---|---|
| 3,973,926 | 8/1976 | Levi | 55/3 |
| 3,992,424 | 11/1976 | Lagow et al. | 260/429.1 |
| 4,200,507 | 4/1980 | Porter, II | 204/158 R |
| 4,206,350 | 6/1980 | Melamed | 250/281 |
| 4,439,404 | 3/1984 | Porter, II | 423/3 |
| 4,567,025 | 1/1986 | Peterson et al. | 204/157.2 |
| 4,661,221 | 4/1987 | Robinson et al. | 204/157.22 |
| 4,704,197 | 11/1987 | Trajmar | 204/157.22 |
| 4,734,177 | 3/1988 | Robinson et al. | 204/157.2 |
| 4,757,203 | 7/1988 | Gil et al. | 250/291 |

OTHER PUBLICATIONS

Burrows et al., "The Photochemistry of the Uranyl Ion", Chem. Soc. Rev., vol. 3, No. 2, pp. 139–165 (1974).
Yokoyama et al., "Crystal Structure of Photosensitive Uranyl Ethoxycarboxylate Complexes", Chemistry Letters, pp. 671–674 (1990).

*Primary Examiner*—Donald P. Walsh
*Assistant Examiner*—Meena Chelliah
*Attorney, Agent, or Firm*—Wenderoth, Lind & Ponack

[57] ABSTRACT

A method of uranium isotope enrichment by utilizing a photochemically selective effect is provided. The method comprises placing a powder of a uranyl compound of carboxylate having at least one oxygen-containing substituent in a magnetic field, irradiating the powder for an effective period of time with visible or shorter wavelength light capable of being absorbed by uranyl ion in the uranyl compound, and separating the resulting reduction products of the uranyl ion from the unreacted uranyl compound by fractionation to isolate a fraction enriched with $^{235}U$ isotope. An ordinary light source having wavelengths of a wide range can be used, and there is no need for uranium gasification and cryogenic cooling which are required in a conventional laser method or molecular laser method.

6 Claims, No Drawings

METHOD OF URANIUM ISOTOPE ENRICHMENT BY UTILIZING A PHOTOCHEMICALLY SELECTIVE EFFECT

BACKGROUND OF THE INVENTION

The present invention relates to a technique of enriching uranium with $^{235}U$ isotope, and more particularly, it relates to a method of uranium isotope enrichment by utilizing a photochemically selective effect.

Since uranium enriched with $^{235}U$ must be used as a nuclear fuel in a nuclear reactor, it is an important technique to enrich uranium in a nuclear fuel cycle.

The uranium enrichment techniques now in use include centrifuge separation and gaseous diffusion methods, while those under development include a laser method.

The laser method comprises selectively exciting only a lighter isotope component with a laser by taking advantage of a slight difference in absorption spectrum between $^{235}U$ and $^{238}U$ due to isotope shift. In this method, gasified uranium is irradiated with a laser beam having a high wavelength purity. Further, a molecular laser method has also been developed, wherein gaseous molecules containing uranium (VI) are expanded and cooled with a diffuser or the like and then irradiated with a laser beam to selectively excite only the lighter isotope component.

Although the above-described optical uranium enrichment according to the laser method has an advantage that a separation factor higher than that of other methods can be obtained, this method has problems in that the gasification of uranium makes the handling thereof complicated and that a laser beam having a high wavelength purity must be used as the exciting light source. The molecular laser method is troublesome in that the molecules to be treated must be cooled to a cryogenic temperature.

SUMMARY OF THE INVENTION

An object of the present invention is to provide a photochemical method of uranium isotope enrichment by using an ordinary light source of wavelengths over a wide range without the necessity for uranium gasification or cryogenic cooling.

According to the present invention, there is provided a method of uranium isotope enrichment by utilizing a photochemically selective effect which comprises preparing a uranyl compound of carboxylate having at least one oxygen-containing substituent, placing a powder of the uranyl compound in a magnetic field, irradiating the powder for an effective period of time with a light of visible or shorter wavelength capable of being absorbed by uranyl ion in the uranyl compound, and separating the resulting reduction products of the uranyl ion from the unreacted uranyl compound by fractionation to isolate a fraction enriched with $^{235}U$ isotope.

When the uranyl compound of carboxylate having at least one oxygen-containing substituent (hereinafter referred to as the "uranyl complex") is irradiated in a magnetic field with a light of visible or shorter wavelength region capable of being absorbed by uranyl ion, the magnetic field applied to the uranyl complex is varied in strength according to the relationship between the internal magnetic field, i.e. the magnetic field of the $^{235}U$ nucleus having a nuclear magnetic moment, and the external magnetic field, i.e. the magnetic field applied from the outside. As a result, the content of $^{235}U$ isotope can be selectively increased either in the photoreduction products of the uranyl ion or in the unreacted uranyl compound.

PREFERRED EMBODIMENTS OF THE INVENTION

Examples of the uranyl complex to be irradiated in the present invention include uranyl ethoxyacetate $UO_2(CH_3CH_2OCH_2COO)_2$, uranyl ethoxypropionate $UO_2(CH_3CH_2OCH_2CH_2COO)_2$, uranyl methoxyacetate $UO_2(CH_3OCH_2COO)_2$ and uranyl hydroxyacetate $UO_2(HOCH_2COO)_2$.

As a raw material of uranium component for preparing these uranyl complexes can be used uranium trioxide $UO_3$ ($^{235}U$ content: ca. 2%) recovered from reprocessing of spent nuclear fuel, or uranyl nitrate $UO_2(NO_3)_2$ ($^{235}U$ content: ca. 0.7%) obtained from refining and converting steps of natural uranium. Uranium trioxide can be transformed into uranyl nitrate by dissolving it in nitric acid. The uranyl complexes can be prepared by adding potassium hydroxide solution to uranyl nitrate solution to precipitate uranyl hydroxide $UO_2(OH)_2$, and then directly adding a ligand such as ethoxyacetic, ethoxypropionic, methoxyacetic or hydroxyacetic acid to the precipitate to crystallize the desired uranyl complex. The microcrystallines of the uranyl complex thus obtained are in the form of solid powder and can be placed in a magnetic field for irradiation.

The magnetic field which is not particularly limited in strength is usually about 0.05 to 1 T (tesla, a unit of magnetic flux density). The magnetic field of around 0.35 T can be realized by means of a permanent magnet, while a stronger magnetic field can be realized by means of an electromagnet.

The photoreduction of the uranyl complex can be induced by any ordinary light source emitting a broad band of spectrum in the visible or shorter wavelength region capable of being absorbed by uranyl ion. The irradiation period may be experimentally determined depending on the kind of uranyl complex and the light source employed and, in general, several to ten-odd hours are adequate for the present purpose. Too long an irradiation time is not advisable, because all uranyl ions are reduced and the selectivity is lost between different uranium isotopes. The irradiation can be performed at a room temperature.

The chemical fractionation for separating the reduction products of the uranyl ion from the unreacted compound can be conducted by, for example, a fractional precipitation method wherein the components are precipitated separately from each other by taking advantage of a difference in solubility, or a fractional dissolution method wherein the components are dissolved with a suitable solvent separately from each other by taking advantage of a difference in solubility. Thus the increased content of $^{235}U$ isotope can be found in one of the fractions separated from each other.

The following example will further illustrate the present invention.

Uranyl ethoxyacetate was prepared from uranyl nitrate ($^{235}U$ content: ca. 0.7%) obtained in refining and converting steps of natural uranium. The sample powder of microcrystalline uranyl ethoxyacetate was spread in an even thickness of about 1 mm on a sample tray made of an aluminum foil having a diameter of about 10 mm, and the sample tray was placed in a magnetic field realized by means of a permanent magnet. The powder was irradiated with visible light of a wavelength of 400 to 500 nm through a colored filter for 7 hours. As a light source was used a medium-pressure mercury lamp. During the irradiation, the sample powder on the tray was stirred at intervals. The strength of the magnetic field was varied in the range of 0.05 to 0.35 T.

After the completion of the irradiation, the sample powder was dispersed into 2.5 ml of acetone. The resulting acetone-insoluble photoreduction products were isolated from the acetone-soluble unreacted compound by using a centrifuge. In this example, the acetone-insoluble photo-reduction products were enriched with $^{235}U$.

The abundance ratios $^{235}U/^{238}U$ of uranium isotopes for the acetone-insoluble and the acetone-soluble fractions were measured with a uranium isotope mass spectrometer to calculate the separation factor α. The results are summarized in Table 1.

TABLE 1

| Magnetic field strength, T | A | B | Separation factor, α |
| --- | --- | --- | --- |
| 0.05 | 0.007271 | 0.007259 | 1.0017 |
| 0.09 | 0.007269 | 0.007257 | 1.0017 |
| 0.14 | 0.007275 | 0.007256 | 1.0026 |
| 0.20 | 0.007277 | 0.007259 | 1.0025 |
| 0.25 | 0.007269 | 0.007254 | 1.0021 |
| 0.34 | 0.007271 | 0.007250 | 1.0029 |

Notes)
A: $^{235}U/^{238}U$ for the reduction products,
B: $^{235}U/^{238}U$ for the unreacted compound,
Separation factor α = A/B.

As described above, according to the method of uranium isotope enrichment of the present invention, any laser sources required for the conventional laser method are not necessary, and ordinary light sources having wavelengths of a wide range can be used. Further, in order to induce isotopically selective reaction, it is unnecessary to gasify uranium, and one needs only irradiate a powdered uranyl complex. Thus treatment of the uranyl complex to be irradiated is very easy. Moreover, there is no need for cooling down to a cryogenic temperature, as is the case for the conventional molecular laser method, and it is possible to irradiate the uranyl complex at a room temperature.

Therefore, the method according to the present invention can be conducted in equipment of a small scale and by a relatively simple procedure.

The foregoing description illustrates specific embodiments within the scope of the present invention and is not to be construed as limiting the scope. It is to be understood that variations and modifications thereof may be made by those skilled in the art without departing from the scope of the invention.

What is claimed is:

1. A method of uranium isotope enrichment which comprises providing a uranyl carboxylate compound in which the carboxylate has at least one oxygen-containing substituent, placing a powder of the uranyl carboxylate compound in a magnetic field, irradiating the powder for an effective period of time with light having a broad band spectrum of visible or shorter wavelength capable of being absorbed by a uranyl ion in the uranyl carboxylate compound to form reduction products containing the uranyl ion, and separating the reduction products containing the uranyl ion from unreacted uranyl carboxylate compound by fractionation to isolate a fraction enriched with $^{235}U$ isotope.

2. The method according to claim 1, wherein the irradiation is carried out in a magnetic field of about 0.05 to 1 tesla.

3. The method according to claim 1, wherein the irradiation is carried out for several to about ten hours.

4. The method according to claim 1, wherein the irradiation is carried out at about room temperature.

5. The method according to claim 1, wherein the fractionation is conducted by a fractional precipitation method or a fractional dissolution method.

6. The method according to claim 1, wherein the uranyl compound of carboxylate having at least one oxygen-containing substituent is selected from the group consisting of uranyl ethoxyacetate, uranyl ethoxypropionate, uranyl methoxyacetate and uranyl hydroxyacetate.

\* \* \* \* \*